United States Patent
Pandurangan et al.

(10) Patent No.: US 10,866,905 B2
(45) Date of Patent: Dec. 15, 2020

(54) ACCESS PARAMETER BASED MULTI-STREAM STORAGE DEVICE ACCESS

(71) Applicant: Samsung Electronics Co., Ltd., Suwon-si (KR)

(72) Inventors: Rajinikanth Pandurangan, Fremont, CA (US); Changho Choi, San Jose, CA (US); Jingpei Yang, Santa Clara, CA (US)

(73) Assignee: SAMSUNG ELECTRONICS CO., LTD.

( * ) Notice: Subject to any disclaimer, the term of this patent is extended or adjusted under 35 U.S.C. 154(b) by 158 days.

(21) Appl. No.: 15/389,270

(22) Filed: Dec. 22, 2016

(65) Prior Publication Data

US 2017/0344491 A1    Nov. 30, 2017

Related U.S. Application Data

(63) Continuation-in-part of application No. 15/230,347, filed on Aug. 5, 2016, now Pat. No. 10,324,832.

(60) Provisional application No. 62/341,578, filed on May 25, 2016, provisional application No. 62/416,144, filed on Nov. 1, 2016.

(51) Int. Cl.
*G06F 12/1009* (2016.01)
*G06F 3/06* (2006.01)
*G06F 12/02* (2006.01)

(52) U.S. Cl.
CPC ........ *G06F 12/1009* (2013.01); *G06F 3/0616* (2013.01); *G06F 3/0643* (2013.01); *G06F 3/0679* (2013.01); *G06F 12/0246* (2013.01); *G06F 2212/7201* (2013.01); *G06F 2212/7204* (2013.01); *G06F 2212/7205* (2013.01)

(58) Field of Classification Search
CPC ............... G06F 12/1009; G06F 2212/7201
See application file for complete search history.

(56) References Cited

U.S. PATENT DOCUMENTS 6,484,235 B1 * 11/2002 Horst ............... G06F 3/061
                                                     711/114
8,615,638 B2   12/2013 Shirlen et al.
8,837,287 B2    9/2014 Dolganow et al.
8,874,835 B1   10/2014 Davis et al.
(Continued)

FOREIGN PATENT DOCUMENTS

JP   2006235960 A    9/2006
JP   2013539148 A   10/2013
(Continued)

OTHER PUBLICATIONS

Office Action for U.S. Appl. No. 15/230,347, dated Dec. 13, 2017.
(Continued)

*Primary Examiner* — Nanci N Wong
(74) *Attorney, Agent, or Firm* — Renaissance IP Law Group LLP

(57) ABSTRACT

Embodiments include a multi-stream storage device, a system including a multi-stream storage device, and a method, comprising: receiving an access to a multi-stream storage device; converting at least one parameter of the access into a stream identifier; and accessing the multi-stream storage device using the stream identifier.

13 Claims, 14 Drawing Sheets

| LA | Size | Stream ID |
|---|---|---|
| 0-00FF | 4K | 0 |
| | Other | 1 |
| 0100-0FFF | 4K | 2 |
| | Other | 3 |
| 1000-9FFF | 0-16K | 4 |
| | 256K | 5 |
| | Other | 6 |
| A000-FFFF | N/A | 7 |

(56) References Cited

U.S. PATENT DOCUMENTS

| | | |
|---|---|---|
| 8,966,201 B2 | 2/2015 | Sela et al. |
| 9,003,159 B2 | 4/2015 | Deshkar et al. |
| 9,015,311 B2 | 4/2015 | Muniraja |
| 9,105,305 B2 | 8/2015 | Werner et al. |
| 9,141,528 B2 | 9/2015 | Gorobets et al. |
| 9,176,864 B2 | 11/2015 | Gorobets et al. |
| 9,183,136 B2 | 11/2015 | Kawamura et al. |
| 9,201,804 B1 | 12/2015 | Egyed |
| 9,436,634 B2 | 9/2016 | Canepa et al. |
| 9,495,102 B2 | 11/2016 | Bisht |
| 9,501,230 B2 | 11/2016 | Hashimoto |
| 9,521,201 B2 | 12/2016 | Ori |
| 9,563,397 B1* | 2/2017 | Stoev .................. G06F 5/10 |
| 2007/0016754 A1* | 1/2007 | Testardi ............ G06F 3/0611 |
| | | 711/206 |
| 2009/0222617 A1* | 9/2009 | Yang ............... G06F 12/0246 |
| | | 711/103 |
| 2012/0072662 A1 | 3/2012 | Jess et al. |
| 2012/0072798 A1 | 3/2012 | Unesaki et al. |
| 2012/0191900 A1 | 7/2012 | Kunimatsu et al. |
| 2012/0254524 A1 | 10/2012 | Fujimoto |
| 2013/0159626 A1 | 6/2013 | Katz et al. |
| 2013/0166856 A1 | 6/2013 | Lim et al. |
| 2013/0326169 A1 | 12/2013 | Shaharabany et al. |
| 2014/0019701 A1 | 1/2014 | Ohira et al. |
| 2014/0281302 A1 | 9/2014 | Horn |
| 2014/0304469 A1* | 10/2014 | Wu ..................... G06F 3/065 |
| | | 711/114 |
| 2015/0074337 A1 | 3/2015 | Jo et al. |
| 2015/0149605 A1 | 5/2015 | de la Iglesia |
| 2015/0309742 A1 | 10/2015 | Amidi et al. |
| 2016/0139838 A1* | 5/2016 | D'Sa .................. G06F 3/0619 |
| | | 711/114 |
| 2016/0170639 A1* | 6/2016 | Velayudhan ........... G06F 3/061 |
| | | 711/114 |
| 2016/0179386 A1 | 6/2016 | Zhang |
| 2016/0179678 A1 | 6/2016 | Camp et al. |
| 2016/0203053 A1* | 7/2016 | Talagala ............ H04L 67/1097 |
| | | 714/6.12 |
| 2016/0266792 A1 | 9/2016 | Amaki et al. |
| 2016/0283124 A1 | 9/2016 | Hashimoto et al. |
| 2016/0283125 A1* | 9/2016 | Hashimoto .......... G06F 16/166 |
| 2016/0306552 A1 | 10/2016 | Liu et al. |
| 2016/0313943 A1* | 10/2016 | Hashimoto ........... G06F 3/061 |
| 2016/0328156 A1 | 11/2016 | Swarbrick et al. |
| 2016/0357437 A1 | 12/2016 | Doerner |
| 2017/0024141 A1 | 1/2017 | Davis et al. |
| 2017/0109096 A1* | 4/2017 | Jean .................. G06F 3/0659 |
| 2017/0123666 A1* | 5/2017 | Sinclair ............... G06F 3/0604 |
| 2017/0161100 A1* | 6/2017 | Rashid .................. G06F 13/12 |
| 2017/0228157 A1 | 8/2017 | Yang et al. |
| 2017/0308722 A1 | 10/2017 | Oikawa et al. |
| 2017/0344470 A1 | 11/2017 | Yang et al. |
| 2018/0074700 A1 | 3/2018 | Tsalmon et al. |

FOREIGN PATENT DOCUMENTS

| | | |
|---|---|---|
| JP | 5723812 B2 | 5/2015 |
| KR | 101544309 B1 | 8/2015 |
| TW | 201227297 A | 7/2012 |
| TW | 201308074 A | 2/2013 |
| TW | 201324150 A | 6/2013 |
| TW | 201604688 A | 2/2016 |
| WO | 2012020544 A1 | 2/2012 |
| WO | 2012039216 A1 | 3/2012 |
| WO | 2015005634 A1 | 1/2015 |

OTHER PUBLICATIONS

Final Office Action for U.S. Appl. No. 15/230,347, dated Apr. 18, 2018.

Kang, Jeong-Uk et al., "The Multi-streamed Solid-State Drive," Memory Solutions Lab., Memory Division, Samsung Electronic Co., 5 pages.

Yang, Fei et al., "Multi-streaming RocksDB," Memory Solutions Group, Samsung Research Center, 2 pages.

Office Action for U.S. Appl. No. 15/230,347, dated Sep. 6, 2018.

Notice of Allowance for U.S. Appl. No. 15/230,347, dated Jan. 24, 2019.

Notice of Allowance for U.S. Appl. No. 15/499,877, dated Sep. 12, 2019.

Ex parte Quayle Action for U.S. Appl. No. 15/499,877, dated Apr. 29, 2019.

Megiddo, Nimrod et al., "ARC: A Self-Tuning, Low Overhead Replacement Cache", Fast '03 Proceedings of the 2nd USENIX Conference on File and Storage Technologies, Mar. 31, 2003, pp. 115-130.

Notice of Allowance for U.S. Appl. No. 15/499,877, dated Jan. 8, 2020.

Office Action for U.S. Appl. No. 15/499,877, dated Oct. 4, 2018.

Yoo, Sanghyun et al., "Block Replacement Scheme based on Reuse Interval for Hybrid SSD System", Journal of Internet Computing and Services, vol. 16, Issue 5, 2015, pp. 19-27.

\* cited by examiner

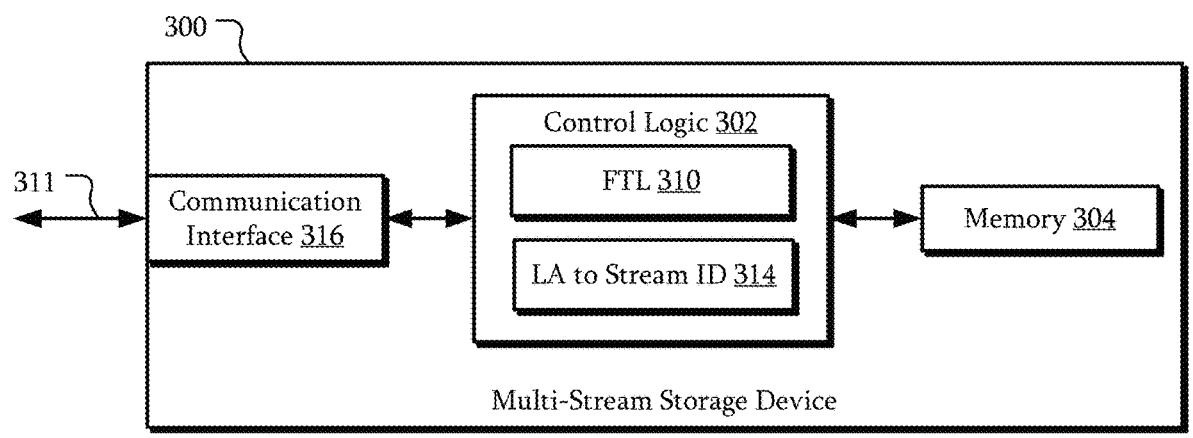

| LA | Size | Stream ID |
|---|---|---|
| 0-00FF | 4K | 0 |
| | Other | 1 |
| 0100-0FFF | 4K | 2 |
| | Other | 3 |
| 1000-9FFF | 0-16K | 4 |
| | 256K | 5 |
| | Other | 6 |
| A000-FFFF | N/A | 7 |

ACCESS PARAMETER BASED MULTI-STREAM STORAGE DEVICE ACCESS

CROSS-REFERENCE TO RELATED APPLICATIONS

This application is a continuation-in-part of U.S. Non-Provisional patent application Ser. No. 15/230,347, filed Aug. 5, 2016, which claims the benefit of U.S. Provisional Patent Application No. 62/341,578, filed May 25, 2016, and claims the benefit of U.S. Provisional Patent Application No. 62/416,144, filed Nov. 1, 2016, the contents of each of which is hereby incorporated by reference herein, in its entirety, for all purposes.

BACKGROUND

This disclosure relates to storage devices and, in particular, address based multi-stream storage device access.

Storage devices may operate in ways that impact latency. For example, data is written to solid state storage devices/drives (SSD) in page units. A block is created from multiple pages. The flash memory can only be erased in block units. If some of the pages in a block are no longer needed, other valid pages in the block are read and written to another block to free up the stale block. The stale block may then be erased. This process is called garbage collection.

Garbage collection may increase the latency of the storage device. In particular, the SSD may not be able to process read and/or write requests while performing garbage collection. As a result, incoming read/write requests may be delayed until the garbage collection has finished.

A multi-stream storage device may be capable of operating with streams where data in one stream are written together and are separated from data in other streams. As a result, data that is logically associated and may have a similar lifetime and/or update frequency are grouped together. Accordingly, garbage collection may be performed more efficiently.

SUMMARY

An embodiment includes a method, comprising: receiving an access to a multi-stream storage device; converting at least one parameter of the access into a stream identifier; and accessing the multi-stream storage device using the stream identifier.

An embodiment includes a system, comprising: a communication interface; and a processor coupled to a multi-stream storage device through the communication interface, the processor configured to: receive an access to the multi-stream storage device; convert at least one parameter of the access into a stream identifier; and access the multi-stream storage device through the communication interface using the stream identifier.

An embodiment includes a multi-stream storage device, comprising: a communication interface; a memory; and control logic coupled to the communication interface and the memory, the control logic configured to: receive an access to the multi-stream storage device; convert at least one parameter of the access into a stream identifier; and access to the memory using the stream identifier.

BRIEF DESCRIPTION OF SEVERAL VIEWS OF THE DRAWINGS

FIG. 3 is a schematic view of a multi-stream storage device according to some embodiments.

FIGS. 4 and 5 are tables illustrating conversions from logical addresses to stream identifiers according to some embodiments.

DETAILED DESCRIPTION

Figure 1:
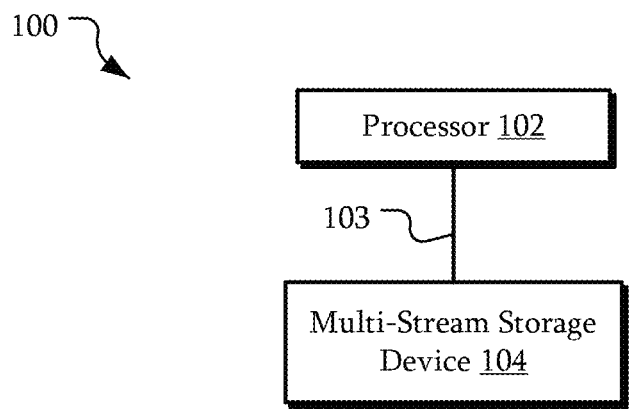
FIG. 1 is a schematic view of a system with a multi-stream storage device according to some embodiments.

The embodiments relate to multi-stream storage device accesses. The following description is presented to enable one of ordinary skill in the art to make and use the embodiments and is provided in the context of a patent application and its requirements. Various modifications to the embodiments and the generic principles and features described herein will be readily apparent. The embodiments are mainly described in terms of particular methods, devices, and systems provided in particular implementations.

However, the methods, devices, and systems will operate effectively in other implementations. Phrases such as "an embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of this disclosure. The embodiments will also be described in the context of particular methods having certain operations. However, the method and system may operate according to other methods having different and/or additional operations and operations in different orders and/or in parallel that are not inconsistent with the embodiments. Thus, embodiments are not intended to be limited to the particular embodiments shown, but are to be accorded the widest scope consistent with the principles and features described herein.

The embodiments are described in the context of particular systems or devices having certain components. One of ordinary skill in the art will readily recognize that embodiments are consistent with the use of systems or devices having other and/or additional components and/or other features. Methods, device, and systems may also be described in the context of single elements. However, one of ordinary skill in the art will readily recognize that the methods and systems are consistent with the use of architectures having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 1 is a schematic view of a system with a multi-stream storage device according to some embodiments. In some embodiments, the system 100 includes a processor 102 coupled to a multi-stream storage device 104 through a communication medium 103.

The processor 102 is a circuit including one or more components such as a general purpose processor, a digital signal processor (DSP), an application specific integrated circuit, a microcontroller, a programmable logic device, discrete circuits, a combination of such circuits, or the like. The processor 102 may include internal portions, such as registers, cache memory, processing cores, or the like, and may also include external interfaces, such as address and data bus interfaces, interrupt interfaces, or the like. Although only one processor 102 is illustrated in the system 100, multiple processors 102 may be present. In addition, other interface devices, such as buffers, communication interfaces, bridges, or the like may be part of the system 100 to connect the processor 102 to internal and external components of the system 100 and to the multi-stream storage device 104. For example the processor 102 and the multi-stream storage device 104 may be coupled though a communication medium 103 such as universal serial bus (USB), small computer system interface (SCSI), peripheral component interconnect express (PCIe), serial attached SCSI (SAS), parallel ATA (PATA), serial ATA (SATA), NVM Express (NVMe), universal flash storage (UFS), Fiber channel, Ethernet, remote direct memory access (RDMA), Infiniband, or the like. Each of the processor 102 and the multi-stream storage device 104 includes a communication interface configured to communicate through the particular communication medium 103 with each other. Accordingly, the processor 102 is configured to transmit access requests, such as read and write requests, and other information to the multi-stream storage device 104. Similarly, the multi-stream storage device 104 is configured to receive such accesses and information through the communication medium 103 and respond to such accesses and information through the communication medium 103.

The multi-stream storage device 104 is any type of data storage device that is capable of writing data in multiple streams where data in one stream are written together and are separated from data in other streams. For example, in some embodiments, data in one stream is written to a different physical location within the multi-stream storage device 104 than data in another stream, i.e., a different block or a different set of blocks within the multi-stream storage device 104. In some embodiments, the multi-stream storage device 104 is a solid state storage device. In other embodiments, the multi-stream storage device 104 is a storage device with shingled magnetic recording. In still other embodiments, the multi-stream storage device 104 is a device that has an asymmetric performance with respect to writes such that writing data logically organized into streams may improve performance of the device. For example, flash memory based storage devices do not allow in-place writes. A new block must be allocated for the write and, to prepare for future writes, the previous block must be erased. In storage devices with shingled magnetic recording, writing to a track that overlaps another track includes rewriting the overlapping track. In such devices, keeping data with similar lifetimes, update frequencies, or the like grouped together using streams can improve performance of the device.

Figure 2A:
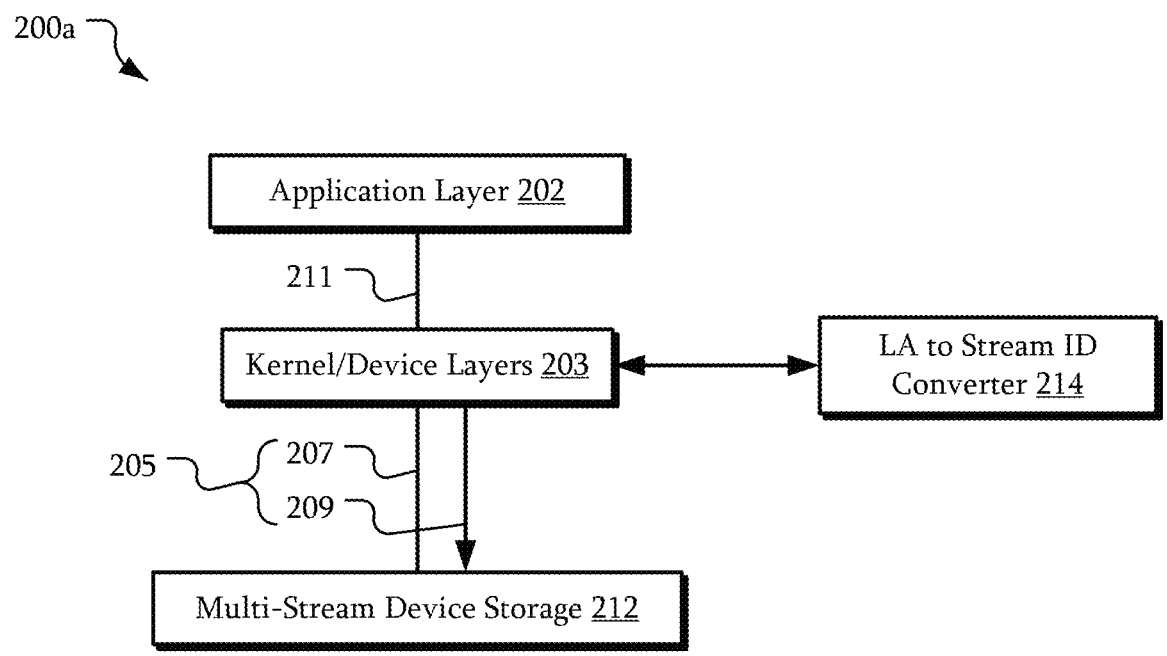
FIGS. 2A-2C are schematic views of functional layers of a system with a multi-stream storage device according to some embodiments.
Figure 2B:
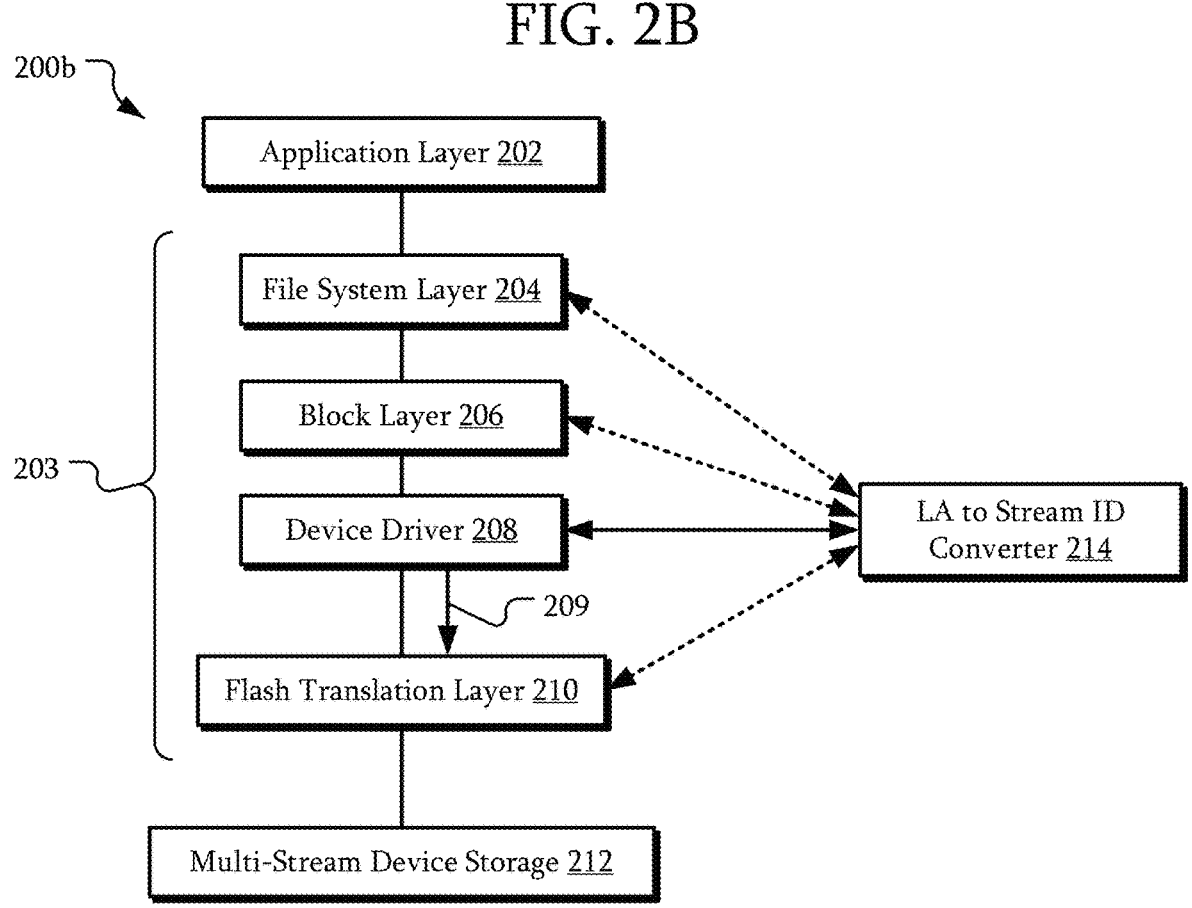
Figure 2C:
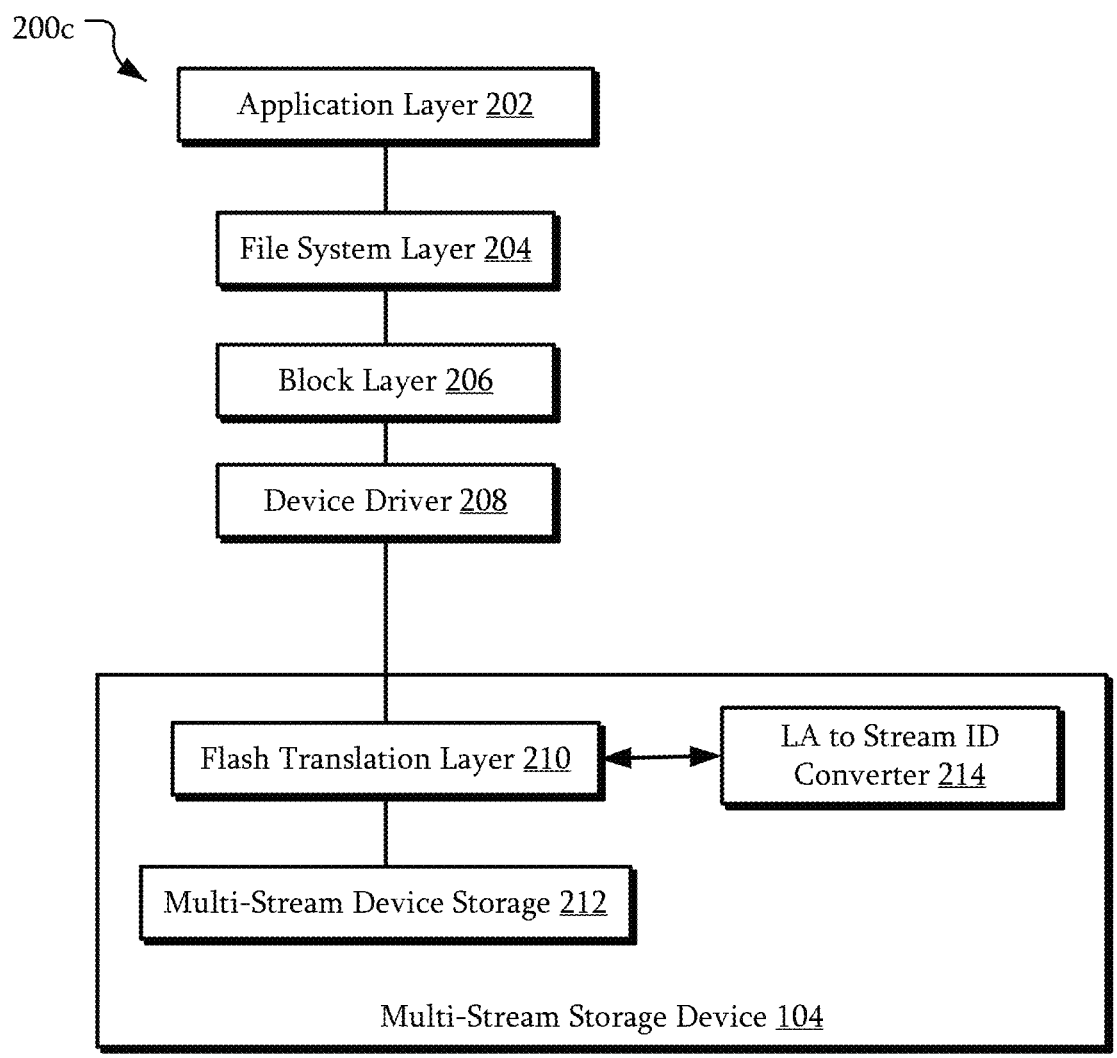

FIGS. 2A-2C are schematic views of functional layers of a system with a multi-stream storage device according to some embodiments. Referring to FIG. 2A and using FIG. 1 as an example, the application layer 202, and the kernel/device layers 203 represent software executing on the processor 102 and or the multi-stream storage device 104. The multi-stream device storage 212 represents the data storage within the multi-stream storage device 104. For example, the application layer 202 may include processes such as user applications, daemons, or the like. The kernel/device layers 203 are various processes and functions that are performed by the processor 102 and/or the multi-stream storage device 104 to access physical data storage of the multi-stream storage device 104. Kernel/device layers 203 may include layers, drivers, or the like between the application layer 202 and the physical data storage of the multi-stream storage device 104. The kernel/device layers 203 may operate below the application layer 202 in user space, in kernel space, and/or on the multi-stream storage device 104.

A multi-stream storage device 104 may have more than one open stream. Multi-stream storage devices 104 may achieve a lower garbage collection overhead and a lower device-level write amplification factor as it is able to group data of similar temperatures, i.e., data that have similar update frequencies and/or lifetimes, and redirect them to the same stream. Within each stream, because the data is more likely to be created and deleted/updated with similar frequencies, by the time garbage collection starts, no data or less data needs to be copied out. This reduced or eliminated amount of data that needs to be copied may reduce the write amplification factor and increase performance.

Grouping data of similar update frequencies may be challenging, especially during run time, and may introduce additional overhead. In addition, while streams may be maintained in a device layer, the application layer 202 may manage the stream open/close and data-to-stream mapping. As a result, taking advantage of the benefit of the streams may require application layer changes. Furthermore, stream allocation in the application layer 202 requires the application developer to be aware of the data temperature and the device specifications, such as the number of total streams. Stream allocation in the application layer 202 also introduces a portability issue in that moving an application from a device supporting N streams to a device supporting M streams may result in sub-optimal performance. In particular, the application layer 202 may request more streams than a specific device model can support, resulting in a mismatch between application streams and device streams.

In some embodiments, performing stream detection and management as described herein may provide several benefits. Performing the stream detection and management in the kernel/device layers 203, below the application layer 202, may eliminate the need of the application layer 202 to manage streams. For example, a particular layer within the kernel/device layers 203 may internally maintain a table of opened streams, open/close streams on demand, manage access to the multi-stream storage device 104 to implicitly open/close streams, and/or otherwise be the initial point of stream related communications with the multi-stream storage device 104. Thus the stream management is independent of the application and may have a minimum overhead while still maintaining or increasing the benefit of the use of streams. In addition to being independent of the application layer 202, as will be described in further detail below, the stream detection and management may be performed at a lower layer within the kernel/device layers 203. Accordingly, the stream detection and management may be independent of and/or transparent to those higher level layers in addition to the application layer 202. In some embodiments, a user space library for stream detection and management for applications may be omitted; however, in other embodiments, the stream detection and management may be performed in a user space device driver of the kernel/device layers 203.

As the stream operations are separated from the application layer 202, application developers need not tailor an application to a specific number of streams and thus, the number of streams a particular device may provide becomes less relevant. In addition, application developers may develop applications without regard to data temperature and, in particular, without code to track data temperature or allocate data to particular streams. Furthermore, applications not specifically developed to take advantage of streams may still gain the benefits of streams.

In some embodiments, one of the kernel/device layers 203 is configured to receive an access 211 associated with the multi-stream storage device 104. A logical address associated with the access is generated by the kernel/device layers 203. One of the kernel/device layers 203 is configured to access the logical address to stream identifier converter 214. The logical address to stream identifier converter 214 is configured to convert the logical address into a stream identifier. The stream identifier is returned to the kernel/device layers 203 and the multi-stream storage device 104 is accessed using the logical address and the stream identifier, represented by access 205 including the stream identifier 209 in addition to the remainder of the access 207. Here, the stream identifier 209 is illustrated as being received by the multi-stream device storage 212; however, in other embodiments, the stream identifier 209 may be used in an earlier kernel/device layer 203 to select a physical address for the multi-stream device storage 212.

Referring to FIG. 2B and using FIG. 1 as an example, the system 200b includes an application layer 202, kernel/device layers 203, and a multi-stream device storage 212 similar to FIG. 2A. Here, the file system layer 204, the block layer 206, the device driver 208, and the flash translation layer 210 represent an example of the kernel/device layers 203 of FIG. 2A. In some embodiments, the multi-stream storage device 104 is a flash memory device and the multi-stream device storage 212 represents the flash memory within the multi-stream storage device 104. While flash memory may be used as an example, the techniques described herein may be applied to other types of storage devices that do not perform in-place update, have limited write endurance, and/or have asymmetric read/write performances.

In some embodiments, the flash translation layer 210 translates logical addresses to physical addresses to access the physical storage of the multi-stream device storage 212. The device driver 208 manages input/output operations to the multi-stream storage device 104 containing the multi-stream device storage 212. The block layer 206 organizes block accesses to the multi-stream storage device 104 through the device driver 208. The file system layer 204 logically organizes the blocks into a filesystem for access by a process in the application layer 202.

The logical address to stream identifier converter 214 is configured to receive a logical address and return a stream identifier. In a particular example, a process in the application layer 202 generates an access to the multi-stream storage device 104, such as a write access to a file stored in the multi-stream storage device 104. This access is sent to the file system layer 204 and handled by each lower level layer. In this example, the device driver 208 accesses the logical address to stream identifier converter 214 to convert a logical address, such as a logical block address, into a stream identifier. The accesses to the lower level layers include the stream identifier 209. Although operations of particular layers have been given as examples, in other embodiments, the layers may perform different functions and/or different layers may be present.

Although the device driver 208 accessing the logical address to stream identifier converter 214 has been used as an example, the conversion may be performed in other layers. The dashed lines represent examples where the stream identifier converter 214 is accessed from the other layers, such as the file system layer 204, the block layer 206, or the flash translation layer 210. While examples of particular layers have been illustrated as accessing the stream to identifier converter 214, the stream identifier assignment could be done in any layer below the application layer 202. In addition, although the logical address to stream identifier converter 214 is illustrated as separate from the other layers of the kernel/device layers 203, in some embodiments, the logical address to stream identifier converter 214 may be part of a particular layer.

In some embodiments, if the conversion is done in the block layer 206, device driver 208, or flash translation layer 210, the conversion may be independent of both the application and file system layers 202 and 204, hiding the complexity of stream management from these layers. In addition, as will be described in further detail below, the conversion of a logical address into a stream identifier may be performed with a lower amount of memory for data structures and performed with simpler code. In some embodiments no extra data structure may be maintained and the conversion may include a evaluating an equation. As a result, the conversion of a logical address into a stream identifier may involve less overhead and thus, may be performed in resource and latency sensitive layers such as the flash translation layer 210.

Referring to FIG. 2C and using FIG. 1 as an example, system 200c includes layers similar to FIG. 2B. In some embodiments, the conversion from logical address to stream identifier is performed in the flash translation layer 210. Here, the flash translation layer 210 is performed on the multi-stream storage device 104. Accordingly, the upper layers and, in particular, any layers executed by the processor 102 need not be capable of operating a storage device with streams. However, since the identification of a stream is performed in the multi-stream storage device 104, an application in the application layer 202 may still gain the advantages of multiple streams.

FIG. 3 is a schematic view of a multi-stream storage device according to some embodiments. Some embodiments include a multi-stream storage device 300 including control logic 302 and memory 304. The control logic 302 is a circuit configured to manage operation of the multi-stream storage device 300 and includes components such as a general purpose processor, a digital signal processor (DSP), an application specific integrated circuit, a microcontroller, a programmable logic device, discrete circuits, a combination of such devices, or the like. The control logic 302 may include internal portions, such as registers, cache memory, processing cores, or the like, and may also include external interfaces, such as address and data bus interfaces, interrupt interfaces, or the like. In addition, other interface devices, such as buffers, memory interface circuitry, communication interfaces, or the like may be part of the multi-stream storage device 300 to connect the control logic 302 to internal and external components.

In some embodiments, the multi-stream storage device 300 includes a communication interface 316 including circuitry that enables the multi-stream storage device 300 to communicate. For example the communication interface may include interfaces according to USB, SCSI, PCIe, SAS, PATA, SATA, NVMe, UFS, Fiber channel, Ethernet, RDMA, Infiniband, or other interfaces. With such communication interfaces, the multi-stream storage device 300 may be configured to communicate through the associated medium with external devices and systems. In some embodiments, the control logic 302 is configured to receive read and write accesses 311 through the communication interface.

The memory 304 is any device capable of storing data. Here, one memory 304 is illustrated for the multi-stream storage device 300; however, any number of memories 304 may be included in the multi-stream storage device 300, including different types of memories. Examples of the memory 304 include a dynamic random access memory (DRAM), a double data rate synchronous dynamic random access memory (DDR SDRAM) according to various standards such as DDR, DDR2, DDR3, DDR4, static random access memory (SRAM), non-volatile memory such as flash memory, spin-transfer torque magentoresistive random access memory (STT-MRAM), Phase-Change RAM, nano-floating gate memory (NFGM), or polymer random access memory (PoRAM), magnetic or optical media, or the like. Although a flash translation layer 310 is used as an example, in other embodiments, translation layers for the particular memory 304 may be used.

In some embodiments, the control logic 302 is configured to execute the flash translation layer 310. The flash translation layer 310 is configured to access the logical address to stream identifier converter 314. Accordingly, the control logic 302 may receive an access 311 through the communication interface 316. As part of processing the access, the flash translation layer 310 may obtain a stream identifier from the logical address to stream identifier converter 314. The control logic 302 is configured to use the stream identifier to determine what portion of the memory 304 to use to process the access 311.

FIGS. 4 and 5 are tables illustrating conversions from logical addresses to stream identifiers according to some embodiments. Referring to FIG. 4, in some embodiments, a logical address to stream identifier converter includes a table that is accessed using the logical address LA to read the stream identifier. In this embodiment, the logical address range of a multi-stream storage device is divided into particular ranges. Here ranges 0-00FF, 0100-0FFF, 1000-9FFF, and A000-FFFF, which are mapped to stream identifiers 0-3, respectively, are used as examples; however, in other embodiments, different ranges, different sizes of ranges, different numbers of ranges, or the like may be used.

In some embodiments, for different workloads from database systems and enterprise datacenter servers, different logical address ranges may have quite different access patterns within one system. For example, blocks within one range may be accessed more frequently than blocks in another range for a certain period of time and one range of data blocks may similar busy/idle ratios over time. Accordingly, associating such ranges of data blocks with a stream may improve performance.

In some embodiments, sizes of the ranges of the logical addresses are selected based an expected type of data to be stored. For example, a range where metadata range size could be smaller than a range where data is expected to be stored.

In some embodiments, the entire address range of a multi-stream storage is divided into a number of ranges. However, in other embodiments, less than all of the address range of the multi-stream storage is divided into a number of ranges. That is, some of the entire address range may not be associated with a stream identifier.

Referring to FIG. 5, in some embodiments, the logical address is converted into a stream identifier by calculating the stream identifier in response to the logical address. For example, in some embodiments, the entire address range, such as a device capacity of N, is divided into M sub-ranges, where the device supports M total streams. Thus each sub-range has a size of N/M. In some embodiments, the determination of a stream identifier may be performed using a table similar to FIG. 4.

However, in other embodiments, an equation may be used to convert the logical address into a stream identifier. For example, FIG. 5 lists 4 equal ranges, each with a size of 4000. Equation 1 may be used to calculate the stream identifier from the logical address.

$$\text{Stream Identifier} = \text{floor}(\text{Logical Address}/4000) \qquad (1)$$

In some embodiments, the address ranges/partitions could be pre-defined or be tuned during run time depending on the implementation. For some embodiments, the entire range can be evenly divided by the number of streams a device can support, or by a specified maximum number of open streams for a certain period of time. In other embodiments, based on the workload characterization, the number of partitions and the size of each partition could be adjusted during operation. In some embodiments, the association of logical addresses to stream identifiers may be changed, including the technique of determining the stream identifiers. For example, the technique may be changed from a fixed sub-range size to different sub-range sizes.

In some embodiments, using such techniques to convert from a logical address to a stream identifier may be performed with a lower computing overhead and memory consumption. In addition, online training for stream detection and re-adjustment during run time may not be needed. As a result, stream management overhead is reduced, but the benefits of multiple streams is maintained or increased.

In some embodiments, the ranges and/or an equation to determine stream identifiers may be established at run time. For example, a multi-stream storage device may determine the number of supported streams. This number may be used by the multi-stream storage device or an upper layer kernel layer to determine the ranges or the equation. In a particular example, a device driver may query a logical address range of a multi-stream storage device and determine the number of supported streams. The device driver may then divide the address range into separate ranges for each of the supported streams.

Alternatively, the device driver may determine the parameters for the equation used to convert logical addresses into stream identifiers. In a particular example, the device driver may replace "4000" in equation 1 above with a value that is the logical address range of the multi-stream storage device divided by the number of supported streams.

Although some examples of mapping a logical address to a stream identifier have been used as examples, in other embodiments, different mappings of logical addresses to stream identifiers may be used. Furthermore, although separate examples have been used, combinations of different techniques may be used. For example, a logical address range of a multi-stream storage device may be first divided into unequal ranges as in FIG. 4 and then each range is subdivided into equal sub-ranges as described with respect to FIG. 5.

Figure 6:
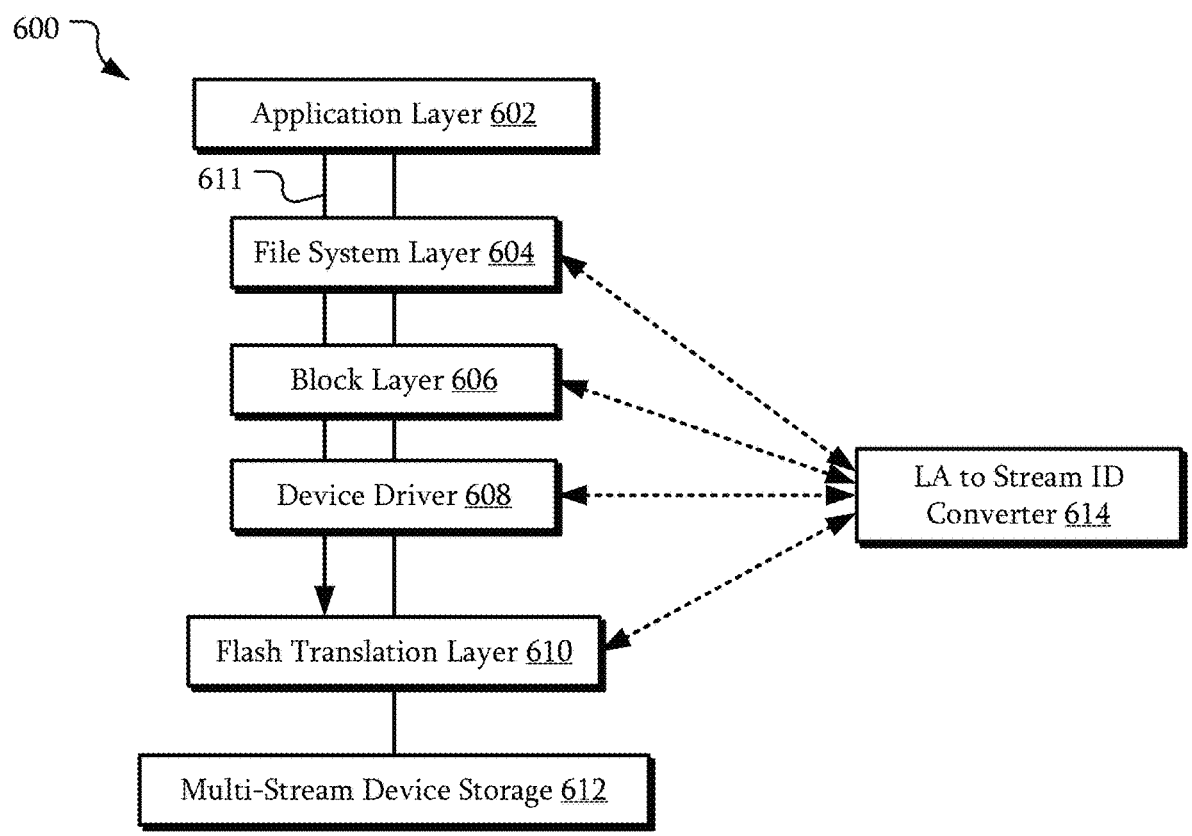
FIG. 6 is a schematic view of functional layers of a system with a multi-stream storage device according to some embodiments.

FIG. 6 is a schematic view of functional layers of a system with a multi-stream storage device according to some embodiments. Referring to FIG. 6 and using FIG. 1 as an example, the system 600 is similar to that of FIG. 2B. In some embodiments, a process in the application layer 602 may provide an application stream identifier 611. While a lower level layer may be capable of converting a logical address into a stream identifier, the application stream identifier may be used instead of a stream identifier generated from a logical address. For example, in some embodiments, the application stream identifier is selected to be used in place of the stream identifier. In other embodiments, the selection between the application stream identifier and the stream identifier may be made based on various criteria, such as one or more performance metrics associated with the multi-stream storage device 104, a mismatch between the number of streams supported by the multi-stream storage device 104 and the application stream identifier, a system configuration parameter, or the like. Here, the transmission of the application stream identifier 611 is represented by the arrow extending from the application layer 602 to the flash translation layer 610.

The relationship of the file system layer 604, block layer 606, device driver 608, or flash translation layer 610 and the logical address to stream identifier 614 is illustrated as a dashed line to represent the capability of converting the logical address into a stream identifier. In particular, when a process in the application layer 602 that does not supply an application stream identifier 611 accesses the multi-stream storage device 104, a stream identifier may still be generated in response to a logical address. Both this operation and the operation described above that uses an application stream identifier 611 may be used substantially simultaneously. That is, processes in the application layer 602 that are not capable of identifying streams may still coexist with other processes that are capable of providing application stream identifiers 611.

Figure 7:
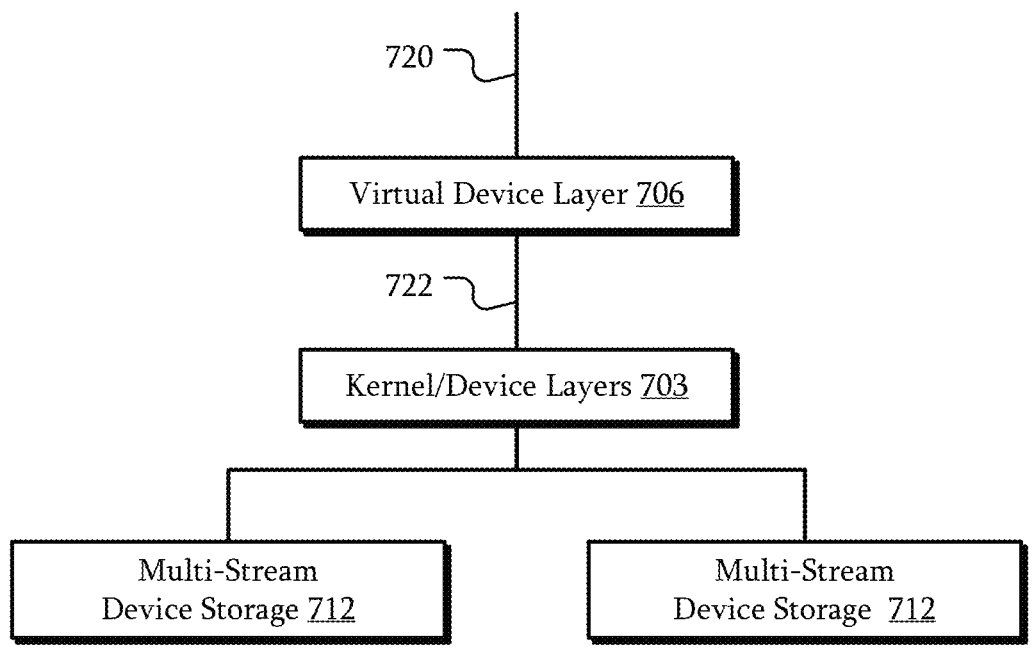
FIG. 7 is a schematic view of functional layers of a system with a multi-stream storage device according to some embodiments.

FIG. 7 is a schematic view of functional layers of a system with a multi-stream storage device according to some embodiments. Referring to FIG. 7 and using FIG. 1 as an example, in some embodiments, a processor 102 may be capable of presenting virtual devices, such as a RAID system, a logical volume formed of multiple physical volumes, or the like. FIG. 7 is a simplified view of various layers operating on a processor 102 and multiple multi-stream storage devices 104. Here, two multi-stream device storages 712 are illustrated corresponding to the multiple multi-stream storage devices 104.

The virtual device layer 706 transforms the single access 720 with a logical address associated with a virtual storage device into one or more accesses 722, each directed towards a corresponding multi-stream storage device 104 and including a logical address associated with that corresponding multi-stream storage device 104. These accesses to the multi-stream storage device 104 have corresponding logical addresses. These logical addresses may be converted into stream identifiers by the kernel/device layers 703 as described above and used to access the multi-stream device storages 712. Accordingly, accesses to a virtual storage device may still gain the benefit of streams.

Figure 8:
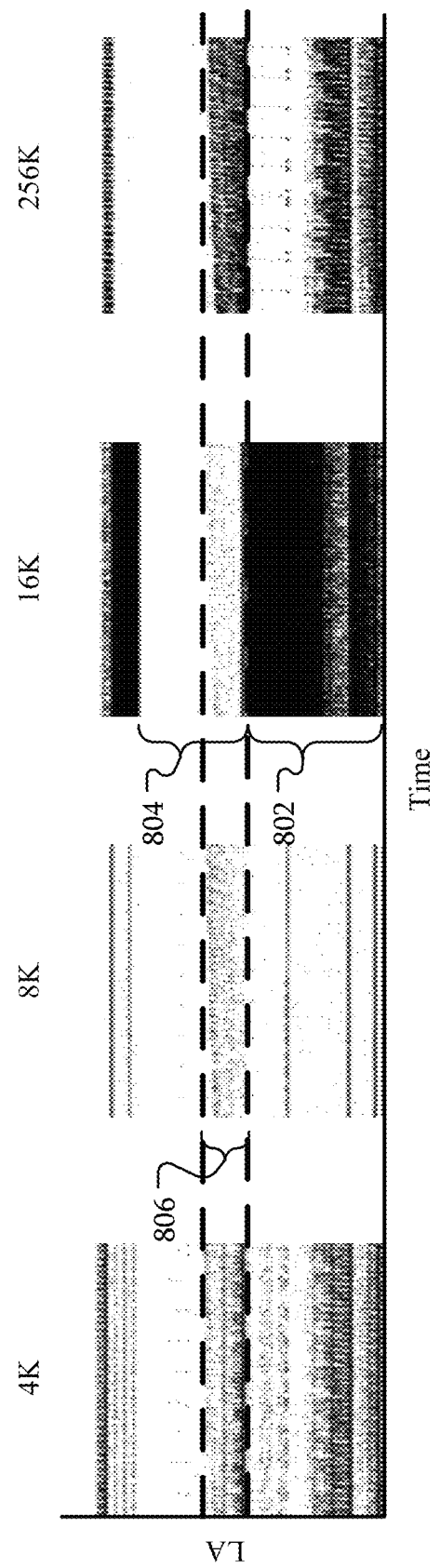
FIG. 8 is a chart illustrating accesses versus logical address and I/O size for an experimental usage dataset.

FIG. 8 is a chart illustrating accesses versus logical address and I/O size for an experimental usage dataset. Four sets of accesses are illustrated, each with a different access size. Here, the access sizes are 4K, 8K, 16K, and 256K. The vertical axis is the logical address and the horizontal access is time. Thus, each of the four portions represents accesses to logical addresses over time for the associated access size.

These charts illustrate the division in accesses versus logical address. Using the 16K portion as an example, a first range 802 of logical addresses has a relatively consistent and higher density of accesses over time. In contrast, a second range 804 of logical addresses has another relatively consistent but lower density of accesses over time. Accordingly, accesses to the first range 802 may have shorter lifetimes or greater access frequencies than accesses in the second range 804. These ranges 802 and 804 may be associated with different stream identifiers.

In addition, these charts illustrate that lifetime or access frequency may also depend on a size of the access. For example, within logical address range 806 for the different access sizes, lifetime or access frequency may also change. Here, for logical address range 806, at a 256K access size, the access density is relatively higher than the access density for 4K, 8K, and 16K accesses. Accordingly, a different stream may be selected for the different access densities for each logical address range. For example, for accesses within the logical address range 806, a first stream identifier may be selected for 256K accesses while one or more other stream identifiers may be selected for accesses of other sizes.

Figure 9A:
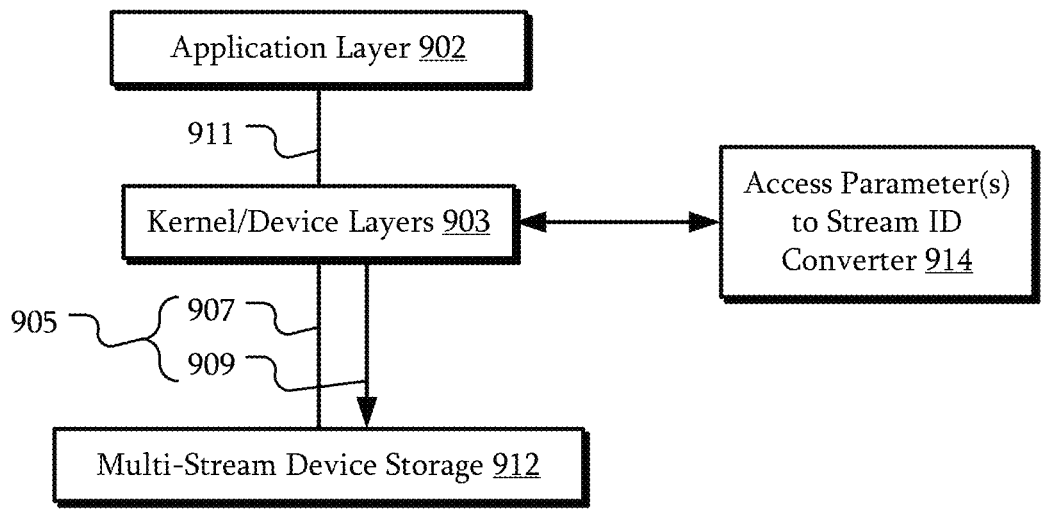
FIGS. 9A-9D are schematic views of functional layers of a system with a multi-stream storage device according to some embodiments.

FIGS. 9A-9D are schematic views of functional layers of a system with a multi-stream storage device according to some embodiments. Referring to FIG. 9A, the system 900a includes an application layer 902, kernel/device layers 903, and a multi-stream device storage 912 similar to the elements described above such as in FIG. 2A. In addition, the application layer 902 is configured to access the kernel/device layers 903 as represented by access 911 and the kernel/device layers 903 are configured to access the multi-stream device storage 912 as represented by access 905, including a stream identifier 909 in addition to the remainder 909, similar to the accesses described above such as those in FIG. 2A.

However, the system 900a includes an access parameter(s) to stream identifier converter 914. The converter 914 is configured to convert one or more parameters of an access into a stream identifier. As described above, a logical address may be a parameter of an access that is used to select a stream identifier. In addition, as described with respect to FIG. 8, a size of an access may also be used to select a stream identifier. Thus, the size of the access may be the parameter of an access.

While a single access parameter may be converted into a stream identifier, in some embodiments, more than one access parameter may be converted into a stream identifier. An access parameter includes any feature of an access that may change between separate accesses. A logical address and a size of an access will be used as an example of multiple access parameters below; however, in other embodiments, different or additional access parameters may be converted into a stream identifier.

Figure 9B:
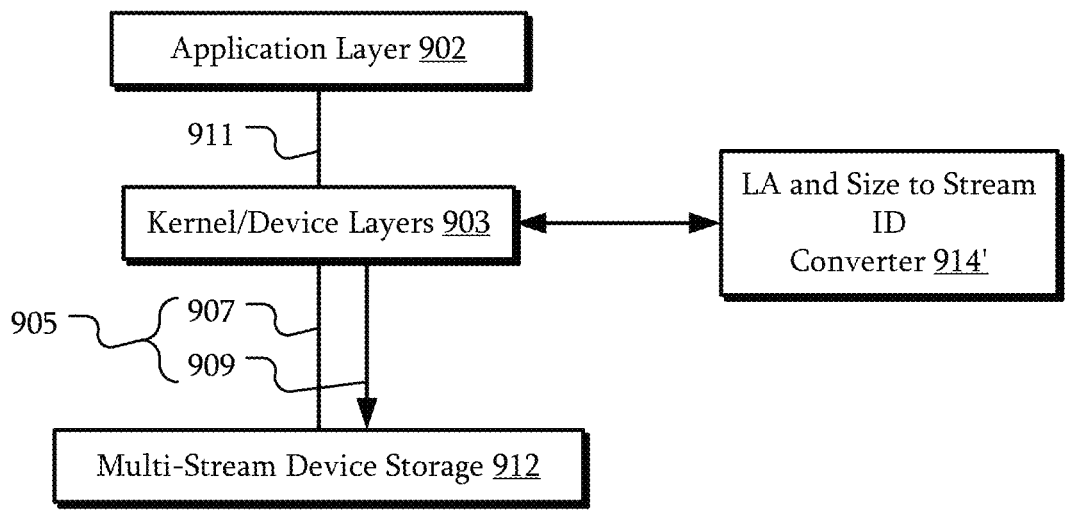

Referring to FIG. 9B, the system 900b may be similar to the system 900a of FIG. 9A. However, the system 900b includes a logical address and size to stream identifier converter 914'. The converter 914' is configured to convert a logical address and a size of an access into a stream identifier.

Figure 9C:
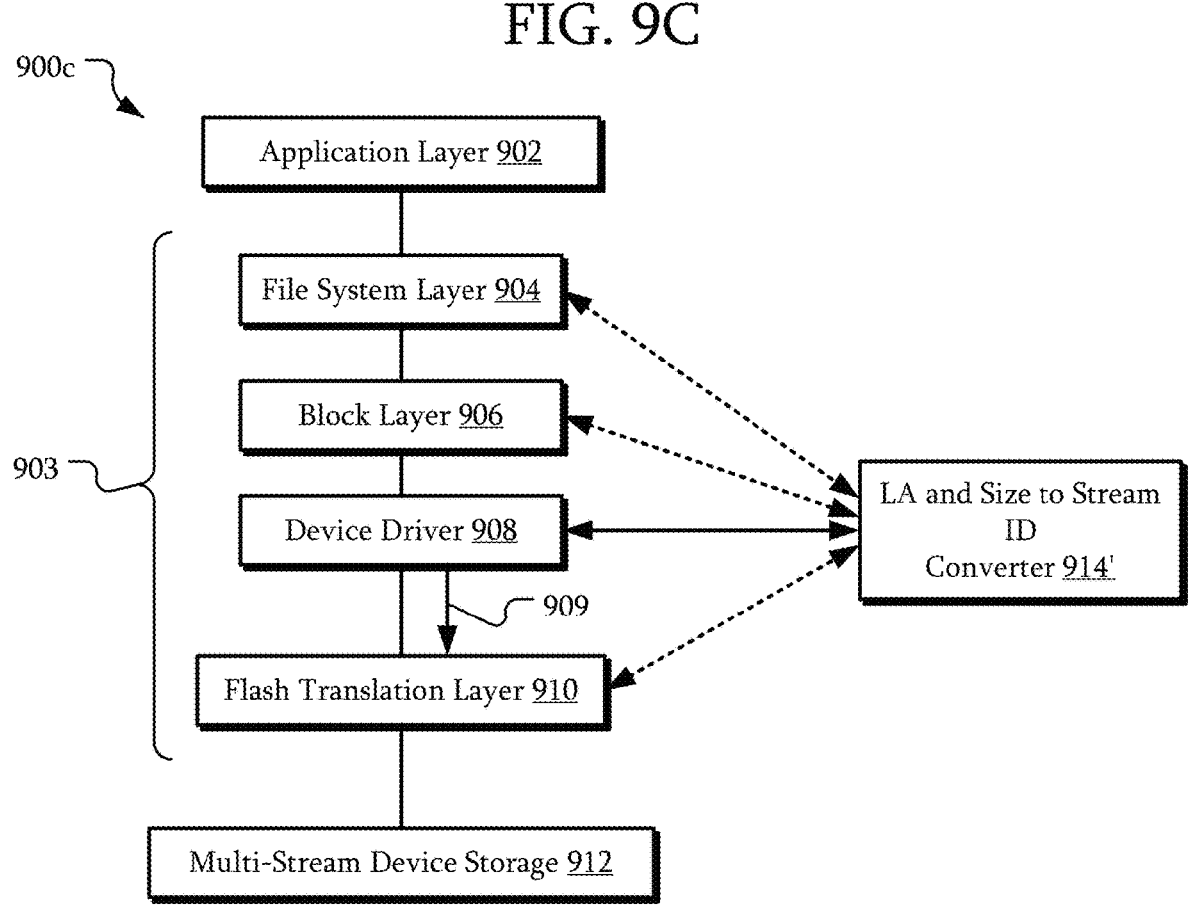

Referring to FIG. 9C, the system 900c, which includes kernel/device layers 903 such as a file system layer 904, a block layer 906, a device driver 908, and a flash translation layer 910, may be similar to the system 900b of FIG. 9B and the system 200b of FIG. 2B. As illustrated the converter 914' may be configured to receive the logical address and the size from any of the kernel/device layers 903 and convert those access parameters into a stream identifier. The converter 914' may be configured to return the stream identifier to the requesting layer or another appropriate layer.

Figure 9D:
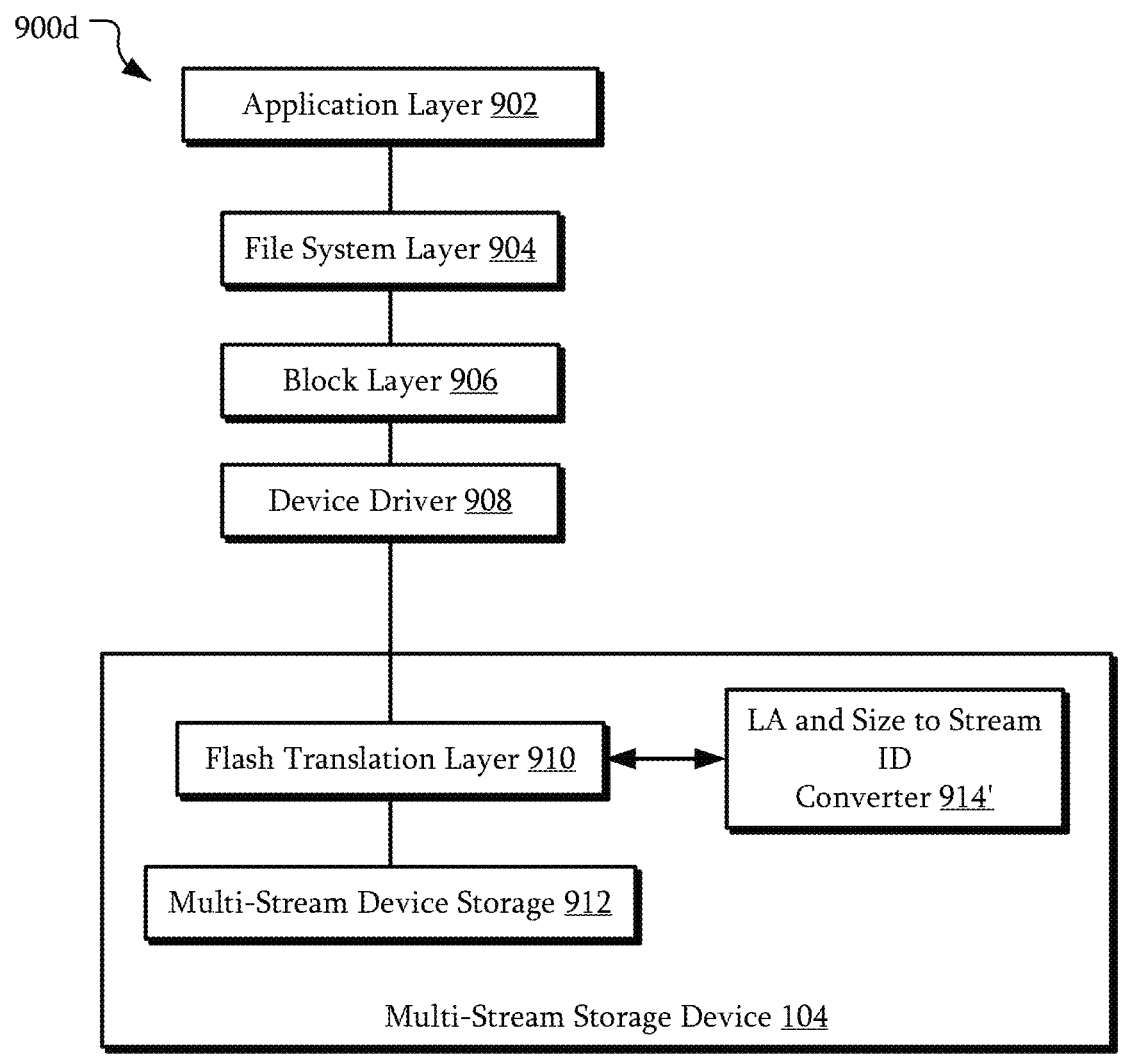

Referring to FIG. 9D, the system 900d is similar to the system 900c of FIG. 9C and the system 200c of FIG. 2C. Here, the converter 914' is part of the multi-stream storage device 104. Accordingly, the conversion from a logical address and a size may be performed in a multi-stream storage device 104, such as in the flash translation layer 910 of that storage device.

Figures 10, 11:
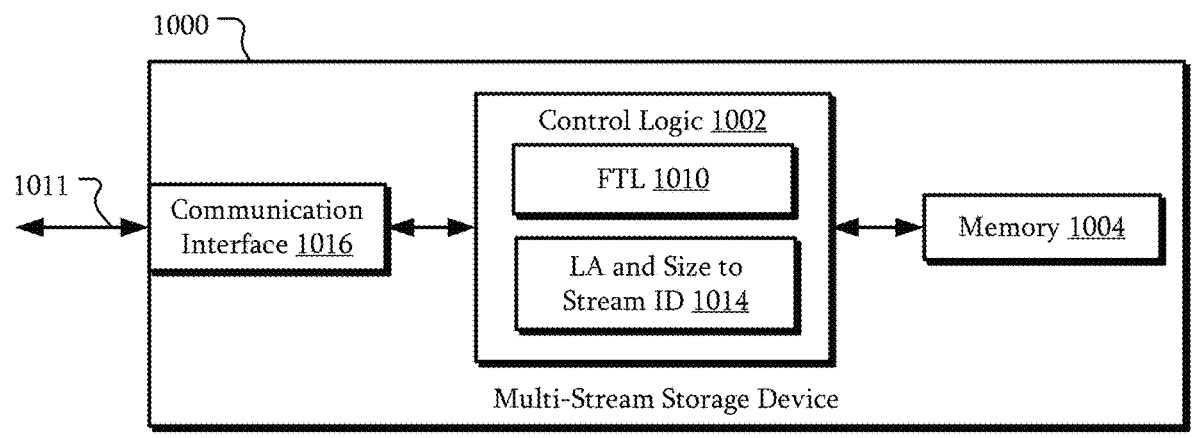
FIG. 10 is a schematic view of a multi-stream storage device according to some embodiments.
FIG. 11 is a table illustrating conversions from logical addresses and access sizes to stream identifiers according to some embodiments.

FIG. 10 is a schematic view of a multi-stream storage device according to some embodiments. The multi-stream storage device 1000, including control logic 1002, a memory 1004, and a communication interface 1016, may be similar to the multi-stream storage device 300 of FIG. 3. The control logic 1002 may similarly include a flash translation layer 1010; however, the control logic 1002 includes a logical address and size to stream identifier converter 1014 similar to those described above.

FIG. 11 is a table illustrating conversions from logical addresses and access sizes to stream identifiers according to some embodiments. In some embodiments, a table may be used to convert a logical address and a size into a stream identifier. In this example, a first logical address range 0-0FFF is further subdivided according to two different access sizes. For this logical address range, the sizes are a 4K size and other sizes. Thus, for accesses having a 4K size, the stream identifier is '0' while for other sizes, the stream identifier is T. Logical address range 0100-0FFF is similarly subdivided according to the same sizes. Thus, the stream identifier is '2' for 4K sizes and '3' for other sizes.

While in some embodiments, the subdivision of a logical address range may be the same for each logical address range, in other embodiments the subdivision may be different. For example, range 1000-9FFF is subdivided into three size categories, 0-16K, 256K, and other sizes. These size categories are assigned stream identifiers '4', '5', and '6', respectively. This particular subdivision illustrates another way in which the access size may be used to select a stream identifier. For example, a range of sizes, such as sizes within 0-16K, may be used to select a particular stream identifier. However, ranges need not be used. In particular, the 256K size may be a single size. That is, only accesses having sizes of 256K will be assigned stream identifier '5'. While a single discrete size has been used an example, in other embodiments, multiple discrete sizes may be used to select a single stream identifier.

In a final example, range A000-FFFF is not subdivided by size. Stream identifier '7' is used for any access to that range. That is, for this range, the size is not used. Although particular examples of ranges, sizes, numbers of subdivisions, numbers of available streams, or the like have been used as example, in other embodiments, such characteristics may be different.

In some embodiments, the logical address may be converted into a set of stream identifiers. For example, the range 1000-9FFF may be converted into the stream identifier set of '4', '5', '6'. The size may then be used to select from among these stream identifiers.

As described above, a stream identifier may be calculated from a logical address. Similarly, a stream identifier may be calculated from one or more access parameters. For example, a logical address and a size may be inputs to a function that generates a stream identifier. In a particular example, the stream identifier may be selected based on dividing sizes by powers of two. Equation 2 below illustrates an example of such an equation.

$$\text{Stream Identifier} = \text{floor}(\text{Logical Address}/LA_{range}) * N_{sizes} + \min(N_{sizes}-1, \max(0, \log_2(\text{Size}/\text{Size}_{min}))) \quad (2)$$

In the example of equation 2, the logical address is divided by a size of the logical address ranges, $LA_{range}$. The resulting integer value is multiplied by the number of sizes, $N_{sizes}$. This provides a base for each logical address range. The remainder of the equation creates a value between 0 and $N_{sizes}-1$ that is based on a base 2 logarithm of the size with a minimum size of $\text{Size}_{min}$. Thus, the stream identifier is based on the logical address being divided into ranges and a base 2 logarithm of the size. Although a particular equation is used as an example, in other embodiments, the equation may be different. In still other embodiments, a table, such as those described above, may be used to determine a portion of a stream identifier and an equation may be used to generate the remainder.

Figure 12:
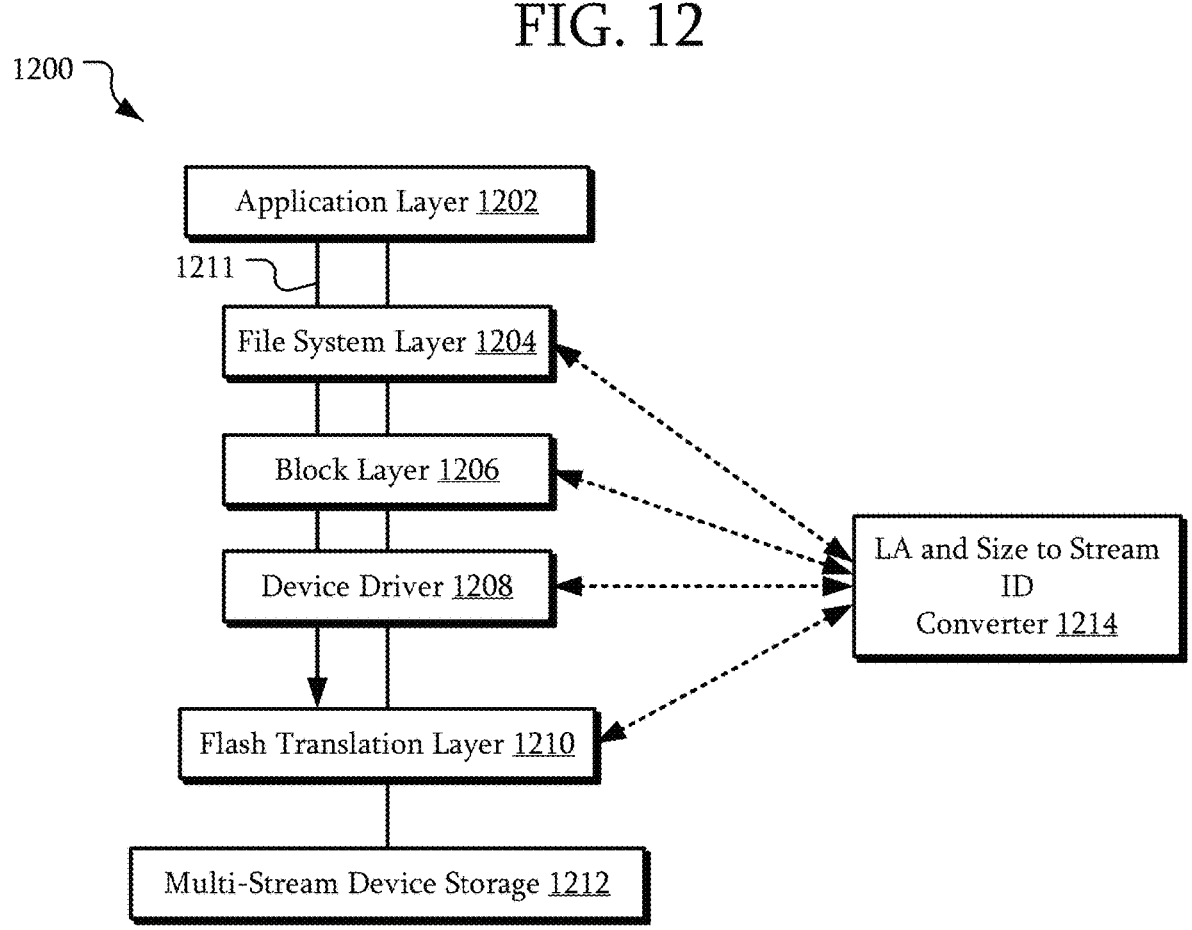
FIG. 12 is a schematic view of functional layers of a system with a multi-stream storage device according to some embodiments.

FIG. 12 is a schematic view of functional layers of a system with a multi-stream storage device according to some embodiments. In this embodiment, the system 1200 includes an application layer 1202, a file system layer 1204, a block layer 1206, a device driver 1208, a flash translation layer 1201, and multi-stream device storage 1212 similar to the system 600 of FIG. 6. Moreover, a process in the application layer 1202 may similarly provide an application stream identifier 1211. However, in this embodiment, the various kernel/device layers are configured to access a logical address and size to stream identifier converter 1214 to generate a stream identifier. This stream identifier may be overridden by the application stream identifier 1211.

Referring back to FIG. 7, in the kernel/device layers 703, a stream identifier may be selected for the each of the multi-stream storage devices 712 based on parameters of the access to that multi-stream storage device 712. For example, logical addresses and sizes of the one or more accesses 722 may be converted into a stream identifier for the corresponding multi-stream storage device 712.

Figure 13:
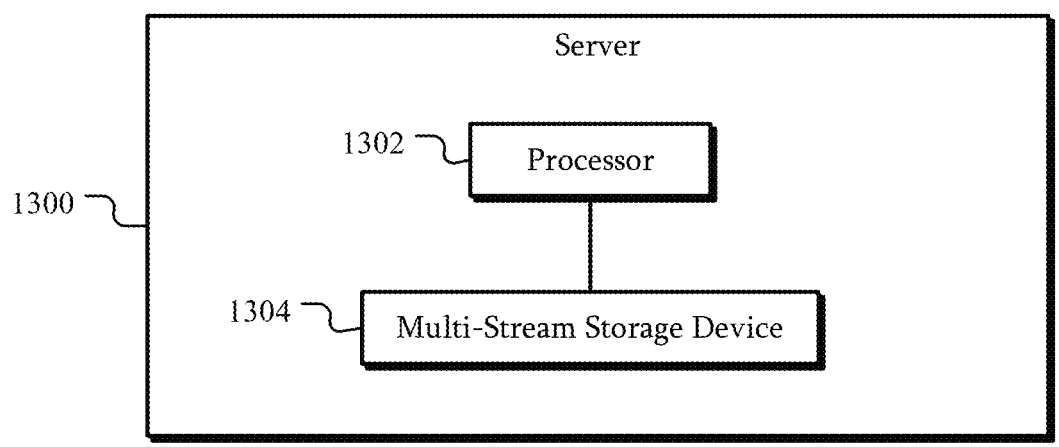
FIG. 13 is a schematic view of a server according to some embodiments.

FIG. 13 is a schematic view of a server according to some embodiments. In some embodiments, the server 1300 may include a stand-alone server, a rack-mounted server, a blade server, or the like. The server 1300 includes a processor 1302 and a multi-stream storage device 1304. The processor 1302 is coupled to the multi-stream storage device 1304. Although only one multi-stream storage device 1304 is illustrated, any number of multi-stream storage devices 1304 may be present. The processor 1302 and/or the multi-stream storage device 1304 may be any of the above described systems and devices. Accordingly, a performance of the server 1300 may be improved.

Figure 14:
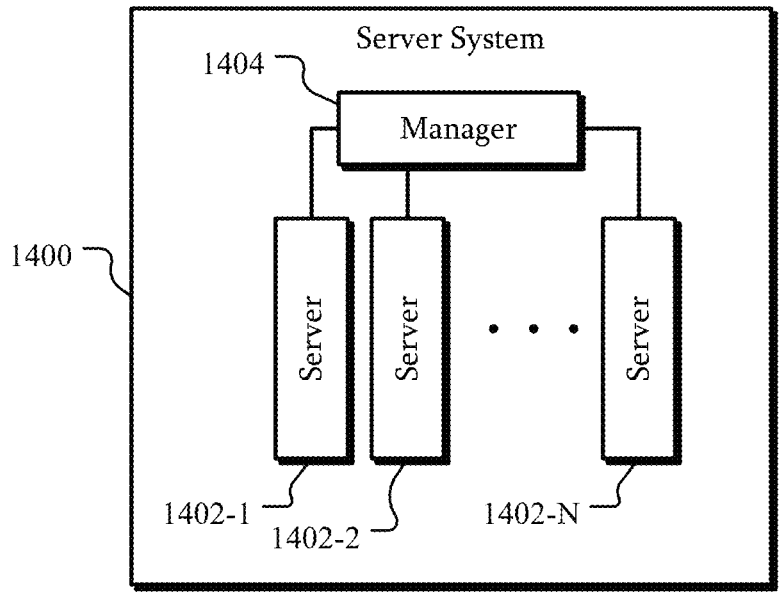
FIG. 14 is a schematic view of a server system according to some embodiments.

FIG. 14 is a schematic view of a server system according to some embodiments. In some embodiments, the server system 1400 includes multiple servers 1402-1 to 1402-N. The servers 1402 are each coupled to a manager 1404. One or more of the servers 1402 may be similar to the server 1300 described above.

The manager 1404 is configured to manage the servers 1402 and other components of the server system 1400. In an embodiment, the manager 1404 may be configured to monitor the performance of the servers 1402. For example, as each of the servers 1402 may include a processor and/or the multi-stream storage device as described above.

Figure 15:
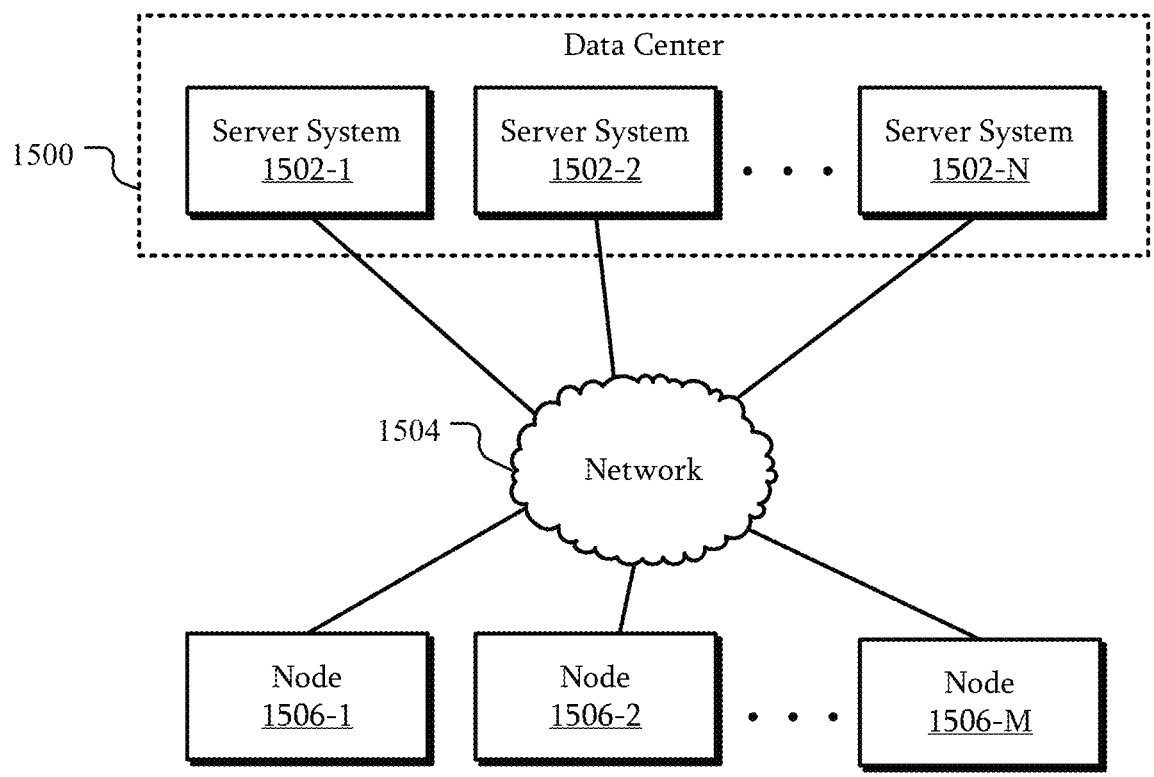
FIG. 15 is a schematic view of a data center according to some embodiments.

FIG. 15 is a schematic view of a data center according to some embodiments. In some embodiments, the data center 1500 includes multiple servers systems 1502-1 to 1502-N. The server systems 1502 may be similar to the server system 1400 described above in FIG. 14. The server systems 1502 are coupled to a network 1504, such as the Internet. Accordingly, the server systems 1502 may communicate through the network 1504 with various nodes 1506-1 to 1506-M. For example, the nodes 1506 may be client computers, other servers, remote data centers, storage systems, or the like.

Although the structures, devices, methods, and systems have been described in accordance with particular embodiments, one of ordinary skill in the art will readily recognize that many variations to the disclosed embodiments are possible, and any variations should therefore be considered to be within the spirit and scope of the structures, devices, and systems disclosed herein. Accordingly, many modifications may be made by one of ordinary skill in the art without departing from the spirit and scope of the appended claims.

The invention claimed is:

1. A method, comprising:
receiving a first access to a multi-stream storage drive, the first access comprising a first parameter, a second parameter and an application stream identifier, the first parameter comprising a first logical address and the second parameter comprising an access size of the first access;
accessing the multi-stream storage drive by selecting between the application stream identifier and a first stream identifier for the first access, the first stream identifier being determined based on the first stream identifier being selected by either:
accessing a mapping table using the first parameter as a first index to the mapping table, the mapping table comprising a set of stream identifiers, the set of stream identifiers comprising a plurality of stream identifiers, and
selecting the first stream identifier of the set of stream identifiers to be the stream identifier for the first access using the second parameter as a second index to the mapping table; or
accessing a mapping table using the second parameter as the first index to the mapping table, and
selecting the first stream identifier of the set of stream identifiers to be the stream identifier for the first access using the first parameter as the second index to the mapping table.

2. The method of claim 1, further comprising:
receiving a second access to a second logical address associated with a virtual storage device; and
converting the second logical address associated with the virtual storage device into the first logical address associated with the multi-stream storage drive.

3. The method of claim 1, wherein selecting the first stream identifier as the stream identifier of the first access is performed in a device driver.

4. The method of claim 1, wherein selecting the first stream identifier as the stream identifier of the first access is performed in a layer below an application layer.

5. The method of claim 1, wherein selecting the first stream identifier as the stream identifier of the first access is performed in the multi-stream storage drive.

6. A system, comprising:
a communication interface; and
a processor coupled to a multi-stream storage drive through the communication interface, the processor:
receiving an access to the multi-stream storage drive, the access comprising a first parameter, a second parameter and an application stream identifier, the first parameter comprising a first logical address and the second parameter comprising an access size of the access;
accessing the multi-stream storage drive through the communication interface using a stream identifier for the access based on a selection between the application stream identifier and a first stream identifier, the first stream being determined by the processor based on the processor selecting the first stream and either:
accessing a mapping table using the first parameter as a first index to the mapping table, the mapping table comprising a set of stream identifiers, the set of stream identifiers comprising a plurality of stream identifiers, and
selecting the first stream identifier of the set of stream identifiers to be the stream identifier for the access using the second parameter as a second index to the mapping table; or
accessing a mapping table using the second parameter as the first index to the mapping table, and
selecting the first stream identifier of the set of stream identifiers to be the stream identifier for the access using the first parameter as the second index to the mapping table.

7. The system of claim 6, wherein the processor further selects the stream identifier for the access in a device driver.

8. A multi-stream storage drive, comprising:
a communication interface;
a memory; and
a control logic coupled to the communication interface and the memory, the control logic:
receiving an access to the multi-stream storage drive, the access comprising a first parameter, a second parameter and an application stream identifier, the first parameter comprising a first logical address and the second parameter comprising an access size of the access;
accessing to the memory using a stream identifier selected between the application stream identifier and a first stream identifier for the access, the first stream identifier being determined based on the first stream identifier being selected by either:
 accessing a mapping table using the first parameter as a first index to the mapping table, the mapping table comprising a set of stream identifiers, the set of stream identifiers comprising a plurality of stream identifiers, and
 selecting the first stream identifier of the set of stream identifiers to be the stream identifier for the access using the second parameter as a second index to the mapping table; or
 accessing a mapping table using the second parameter as the first index to the mapping table, and
 selecting the first stream identifier of the set of stream identifiers to be the stream identifier for the access using the first parameter as the second index to the mapping table.

9. The multi-stream storage drive of claim 8, wherein the control logic further determines the stream identifier in a flash translation layer.

10. A method, comprising: receiving a first access to a multi-stream storage drive, the first access comprising a first parameter, a second parameter, and an application stream identifier, the first parameter comprising a first logical address and the second parameter comprising an access size of the first access;

accessing the multi-stream storage drive using a stream identifier for the first access determined by:
 accessing a mapping table using the first parameter as a first index to the mapping table, the mapping table comprising a set of stream identifiers, the set of stream identifiers comprising a plurality of stream identifiers, and
 selecting a first stream identifier of the set of stream identifiers to be the stream identifier for the first access using the second parameter as a second index to the mapping table; or
 accessing a mapping table using the second parameter as the first index to the mapping table, and
 selecting the first stream identifier of the set of stream identifiers to be the stream identifier for the first access using the first parameter as the second index to the mapping table; and
selecting in a layer below an application layer the first stream identifier as the stream identifier of the first access, the selection of the first stream identifier being a selection between the application stream identifier and the first stream identifier to use in accessing the multi-stream storage drive.

11. The method of claim 1, further comprising:
receiving a second access to a second logical address associated with a virtual storage device; and
converting the second logical address associated with the virtual storage device into the first logical address associated with the multi-stream storage drive.

12. The method of claim 10, wherein selecting the first stream identifier as the stream identifier of the first access is performed in a device driver.

13. The method of claim 10, wherein selecting the first stream identifier as the stream identifier of the first access is performed in the multi-stream storage drive.

* * * * *